UNITED STATES PATENT OFFICE.

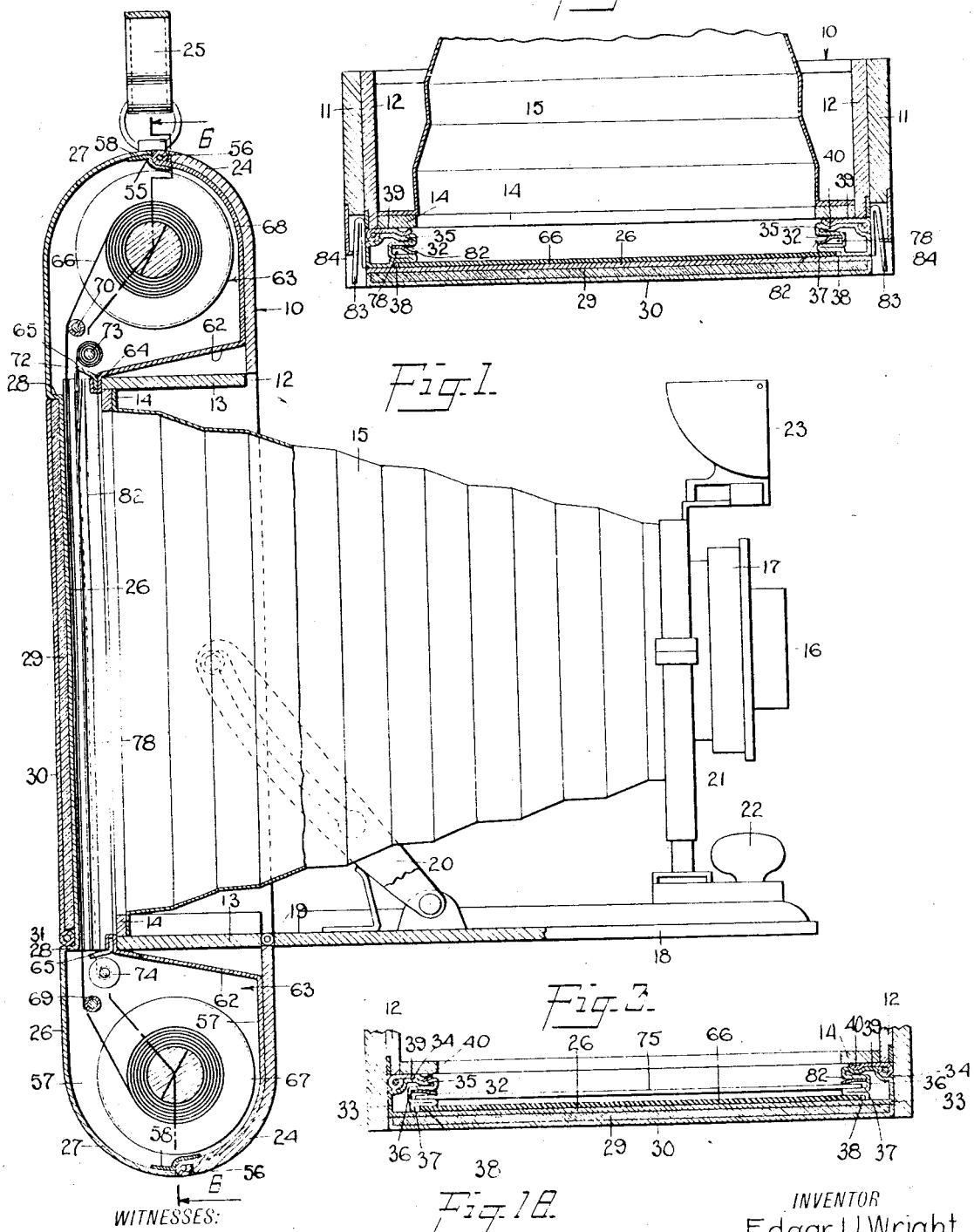

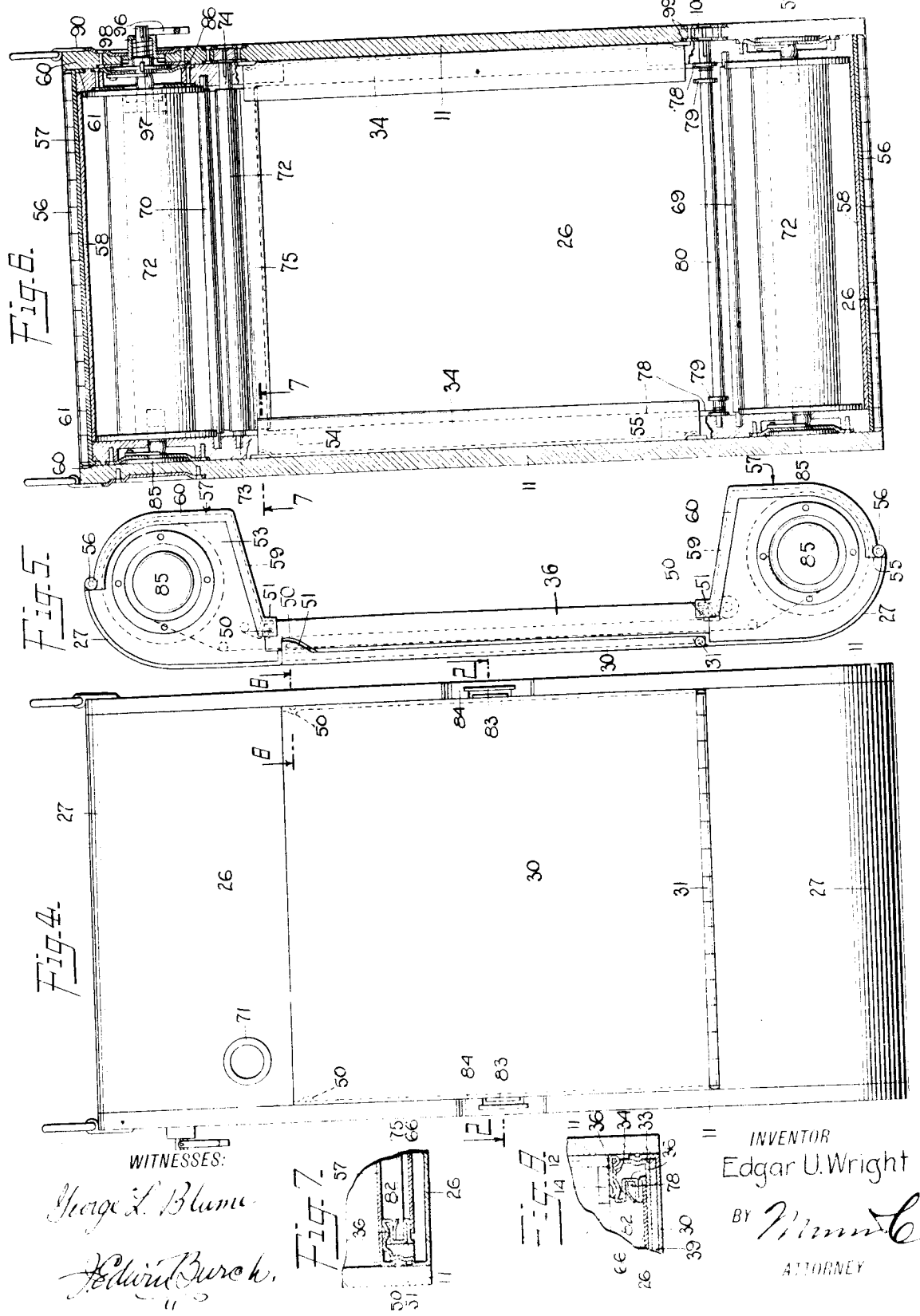

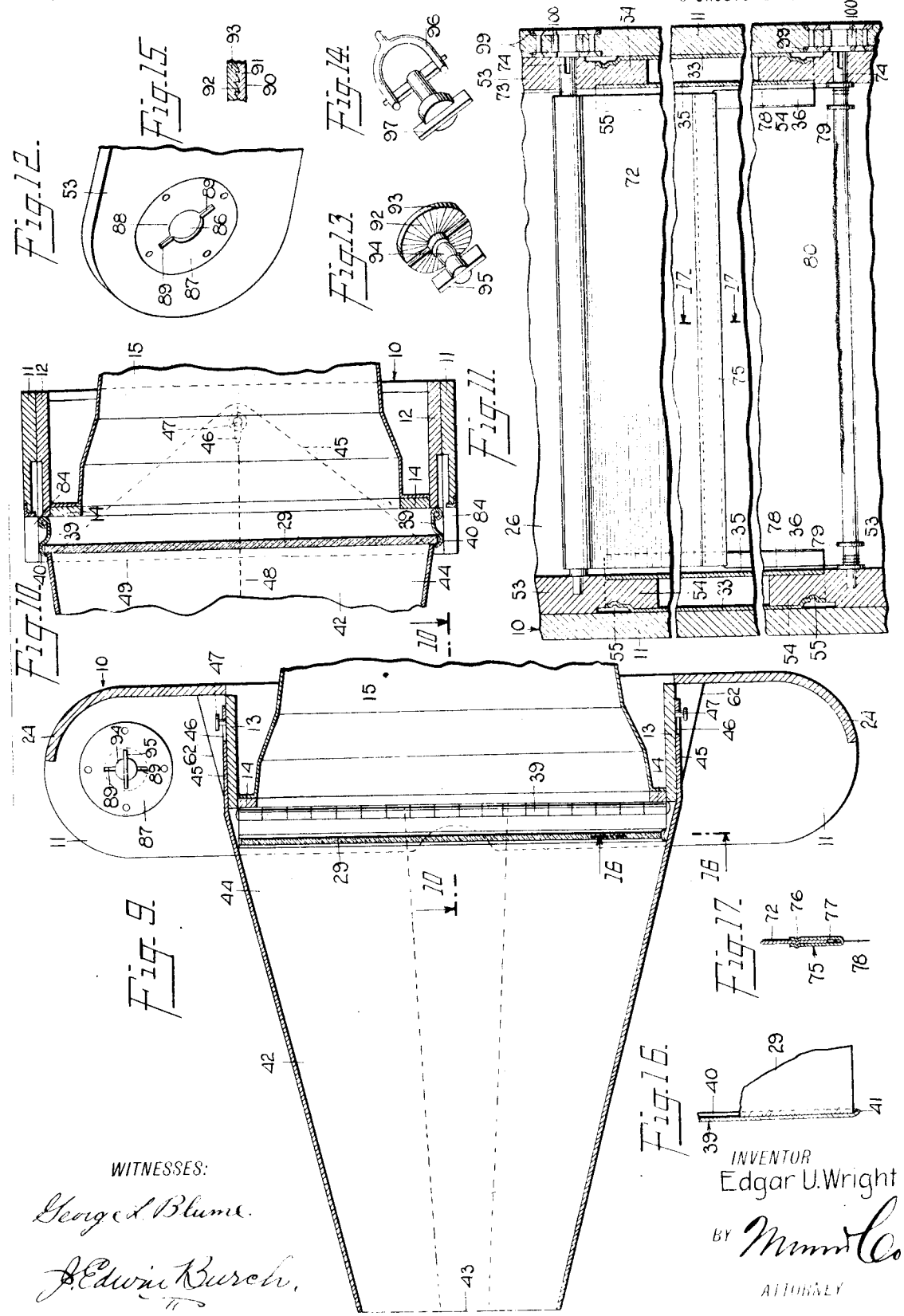

EDGAR U. WRIGHT, OF NEWARK, NEW JERSEY.

FOCUSING ROLL-FILM CAMERA.

1,181,713.  Specification of Letters Patent.  Patented May 2, 1916.

Application filed January 6, 1915. Serial No. 732.

*To all whom it may concern:*

Be it known that I, EDGAR U. WRIGHT, a citizen of the United States, and a resident of Newark, in the county of Essex and State of New Jersey, have invented a new and Improved Focusing Roll-Film Camera, of which the following is a full, clear, and exact description.

This invention relates to the class of photography and has special reference to improvements in cameras, the primary object being to provide a novel and simple roll film camera which can be ;ed in an ordinary way for taking snap )ts or time pictures but which can alsc ised as a focusing camera so that a high degree of accuracy is possible in obtaining a clear image and consequently for producing a clear picture without resorting to charts or guess-work in setting a camera at the proper focus, as by means of the usual finder.

Another object of the invention is to provide an improved focusing roll film camera in which the back portion is constructed and designed to carry the film rolls in such a manner that when said back portion is connected to the front part of the camera, a device of neat appearance will be produced in which the film will be held taut and rectilinear at the portion which is exposed when the shutter is open to take a picture, this being an important adjunct to the best results as distinguished from the bulging or curving of the exposed portion of the film and such as to insure clear pictures.

In connection with the last named object, it is also an object of the invention to provide means for housing the film rolls in such a manner as to exclude light therefrom but to render the same readily accessible for removing and renewing the films, to provide for covering the portion of the film between the rolls when the back of the camera is removed to permit focusing when the light chamber is extended, to provide on the back portion a receptacle for supporting a ground or smoked glass panel adapted to be removably supported by said front portion in the rear of said extensible light chamber when the back portion is removed and the film protected as specified to obviate the necessity of taking the camera apart in a dark room, there being a hood adapted for attachment to the front portion of the camera for use in focusing when the panel is in position as specified so as to obviate the use of a cloth.

A still further object of the invention is to provide a camera of the class described in which a considerable portion of the camera is constructed of metal such as sheet aluminum, whereby the camera is rendered light in weight, strong and neat in appearance, certain of the metallic parts being bent to provide for the retention and movement of a curtain designed to thoroughly cover the portion of the sensitized film which would be exposed to the light at the rear of the light chamber when a picture is taken, to provide for the retention in closed position of covers for the film rolls and the ground glass used in focusing, means being also provided for moving the curtain in positions to cover and uncover the film at the light chamber and further means to move the sensitized film when the back portion of the camera and the front portion of the camera are assembled, the pivots or supports for the film rolls being so mounted as to be excluded from view when said parts are assembled as specified, with the exception of the film-moving means.

With the above and other objects in view, the invention resides more particularly in the peculiar combination and arrangement of parts to be hereinafter more fully described, illustrated and claimed, it being also an object to provide a device which is simple in construction, durable and efficient in operation and not likely to get out of working order.

Reference is to be had to the accompanying drawings forming a part of this specification, in which similar characters of reference indicate corresponding parts in all the views and in which—

Figure 1 is a vertical longitudinal sectional view of a focusing roll film camera constructed in accordance with my invention; Fig. 2 is a cross sectional view taken on the line 2—2 of Fig. 4; Fig. 3 is a similar view taken at one side of the line on which the section 2—2 is taken and with the curtain which coöperates with the back portion to cover the sensitized film shifted; Fig. 4 is a back view of the camera; Fig. 5 is an edge elevation of the back portion of the camera; Fig. 6 is a transverse longitudinal sectional view taken on the line 6—6 of Fig. 1; Fig. 7 is a detail fragmentary cross sectional view taken on the line 7—7 of Fig. 6; Fig. 8 is a similar view taken on the line 8—8 of Fig. 4; Fig. 9 is a fragmentary vertical longitudinal sectional view of the camera as in Fig. 1 but with the back portion removed and the ground glass panel and focusing hood in position; Fig. 10 is a fragmentary cross sectional view taken on the line 10—10 of Fig. 9; Fig. 11 is an enlarged fragmentary transverse longitudinal sectional view through the camera similar to Fig. 6 but taken on a line coincident with the plane of the curtain which covers the portion of the sensitized film between the rolls; Fig. 12 is a fragmentary perspective view of one end of the back portion of the camera; Fig. 13 is a similar view of the part coöperative with said structure shown in Fig. 12 for engaging a film roll; Fig. 14 is a perspective view of an operating key carried by the front portion to engage the member shown in Fig. 13; Fig. 15 is a detail fragmentary sectional view of the coöperative faces of the parts shown in Figs. 12 and 13; Fig. 16 is a detail fragmentary sectional view taken on the line 16—16 of Fig. 9; Fig. 17 is a detail sectional view taken on the line 17—17 of Fig. 11; Fig. 18 is a plan view of the key used for operating the curtain.

In carrying the invention into practice, the camera is made up of a front portion 10 having side walls 11 which are reinforced on the inside by strips 12 producing the sides of a frame formed therewith by end walls 13 which are positioned between and at right angles to the side portions 11 and the strips 12, at spaced distances from the ends of said front portion. This frame at its inner or back portion, spaced from the rear edges of the sides 11, is provided with a surrounding internal shoulder or extension 14 which serves for the attachment of an extensible light chamber or bellows 15 which, when folded or collapsed, is accommodated inside of the frame and front portion of the camera. The small end of the light chamber carries the usual lens 16 and shutter 17 operable in the usual or any preferred way and arranged to be adjustably moved along a closure 18 provided for the front of the camera. This closure is hinged to the front portion as shown at 19, the connection being set inside a rabbet in said front portion so that the closure will lie flush with the front portion when closed but may be supported at right angles thereto as shown in Fig. 1 and held in such position by diagonal braces or break joints 20 connecting the closure to the side portions 11 on the inside thereof.

A suitable frame or uprights 21 are provided for supporting the hood upon the closure when extended, the clamping means being generally indicated by the numeral 22, while a finder 23 is provided for viewing the object, study or scene, the picture of which is to be taken. In using this finder, however, it is impossible to accurately focus the camera to such degree that a perfect picture will be produced. For this reason the present invention is devised, and aside from the mounting of the light chamber and the parts enumerated thereafter, the improvement consists in having the front portion of the camera at the curved ends 24 of the casing of the latter terminating about midway of the width of the side walls 11, the usual hand grip or strap 25 being secured to said side walls 11 if desired.

The camera further includes a back portion 26 which may be made of any desired material, though preferably of sheet metal such as aluminum, and said back portion is provided with curved ends 27 conforming to the curvature of the portions 24 and meeting the extremities of the latter, as is clearly shown in Fig. 1 of the drawings. The intermediate portion of the back portion 26 is depressed or inset as shown at 28 to provide a seat for accommodating a ground or smoked glass panel 29 adapted to be concealed by a cover 30 which is hinged as shown at 31 to said back portion at one end of the depression and within the latter so as to provide a smooth continuous surface in which the cover is flush with the back portion proper beyond said depression. The intermediate longitudinal edges of the back portion adjacent to said depression are provided with guideways 32 and for this purpose said edges are bent forwardly at right angles as shown at 33, then inwardly as shown at 34 with a rearward depression 35 longitudinally thereof, and then rebent outwardly and inwardly as shown at 36 in substantially U-shape or channel form, while the free edges are again bent outwardly and then rearwardly, as shown at 37, to contact with the inner face of said back portion and form guideways or grooves 38 therewith.

The front portion of the camera at the back of the frame, and at the sides thereof coincident with the intermediate portions of the back portion which are bent as described, is provided with plates or strips 39 which are hinged to the front part as through the medium of the reinforcing strips 12, the hinged connection being accommodated by bending the edges of the back portion to conform thereto when said strips are disposed toward the shoulder or extension 14. These plates or strips 39 have their free edges formed with depressions 40 constituting guideways longitudinally thereof for accommodating the ground or smoked glass panel in the manner shown in Fig. 10 of the drawings, the panel being held from displacement at coincident ends of the guideways by shoulders 41 produced by bending the strips inwardly at said ends, while the curved portions producing the depressions 40 are accommodated by the depressions 35 in the rebent intermediate portions of the longitudinal edges of the back part 26, these rebent intermediate portions preferably constituting extensions of a blank from which said back portion is produced. The other ends of the depressions 40 in the strips or plates 39 permit the free entrance of the ground glass panel into the grooves when said strips are moved on their pivots to contact with the inner faces of the side portions 11, the ground glass panel being sufficiently large to overlie the opening in the frame at the large end of the light chamber to permit focusing therethrough.

To obviate the use of a cloth in focusing, a hood 42 is provided, the same comprising a casing of leather or other material which is substantially in the form of a truncated pyramid, that is, rectangular in cross section and tapering toward the sight end 43 while the large end 44 corresponding to the base of the pyramid is provided with top and bottom extensions 45 which are of triangular form, as shown in dotted lines in Fig. 10, and which are provided with openings 46 to engage buttons or pegs 47 carried by the outer faces of the end walls 13 of the frame. In this manner the hood is held in position while the camera is supported on a tripod or otherwise, as is usually done, and the hands are free for use in handling the camera and making the necessary adjustments. This hood is designed to fold along the dotted lines 48, that is, longitudinally of the top and bottom portions thereof in the manner of a bellows, as shown in dotted lines in Fig. 9, while the extensions 45 will fold along the dotted lines 49 in contact with said top and bottom portions prior to the folding of the latter and the collapsing of the hood. When the device is folded to the camera the vertical edges of the side portions thereof at the enlarged end of the hood will be brought closely in contact with the ground glass panel and light will be excluded from entering to interfere with the focusing operation.

The cover 30 is held in the closed position against the rebent portions of the back by means of projections 50 in extensions 51 bent at right angles to the cover near the free end thereof to engage corresponding depressions in the portions 33, the projections being designed to snap into and out of the depressions. The sides of the back portion near the extremities thereof are in the form of enlargements 53 which are provided with reduced extensions 54 projecting inwardly and received by the extremities of the rebent intermediate portions of the back, as is clearly shown in Fig. 1 of the drawings, and held by suitable fastening means produced by depressing or insetting the rebent portions of the metal to engage said wooden enlargements, as shown at 55. While the intermediate rebent portions are described as being made of metal and the enlargements of wood, it is not desired to restrict the construction to this particular material nor to the exact method of attaching the enlargements to the rebent portions as shown, as various means of connecting said parts may be employed.

The enlargements 53 forming portions of the sides of the back portion 26 of the camera are engaged at their rear edges by said back portion beyond the depression 28 and at the curved portions 27, the extremities of said back portion terminating intermediately the width of the sides adjacent to the extremities of the front portion 10 at this point. The enlargements 53 are provided with shoulders 55 which accommodate the extremities of the front portion as well as hinges 56 pivotally connecting closures 57 to said back portion, the outer faces of the curved portions 24 and 27 thus coming together flush and all of the external parts being designed to be covered by the leather or the like as is usual in camera construction.

In order to exclude light at the hinged connections 56, spring metal plates 58 are attached to the inner faces of the end portions 27 to overlie said hinged connections and contact with the inner faces of the closures 57 which are connected thereto, the interior parts being painted black or otherwise darkened to make more positive the exclusion of light and to obviate injury to the sensitized film, as is common. The closures 57 coöperate with the edge portions of the enlargements 53 opposite to the curved edge portions 27 and the beveled edges 59, said closures being provided with side flanges 60, seated in corresponding rabbeted portions 61 in the outer faces of said edge portions so as to lie flush and permit the back portion to be accommodated between the sides 11 of the front portion of the camera when the parts are fitted together.

The extremities of the reinforcing strips 12 are beveled as shown at 62 in Fig. 9 of the drawings so that when said parts are assembled the beveled or sloping portions of the closures 57 which contact with the edges 59 will contact with the ends of the reinforcing strips, as shown in Fig. 1 of the drawings, so that the parts will fit snugly and uniformly together. The closures 57 are held in position by fastening means similar to the fastening means employed in connection with the cover 30 except that they engage from the opposite sides of the rebent portions, details of this structure being shown in Figs. 7 and 8 of the drawings. The closures 57 also coöperate with the enlargements or end portions of the back part of the camera to produce chambers 63 owing to the provision of which the back part of the camera may be described as having an intermediate narrow portion or seat which accommodates the frame of the front part carrying the light chamber so that the intermediate portion of the back part of the camera will be brought in contact with the frame and more particularly the shoulder or extension 14 thereof, the intermediate portions of the longitudinal edges of the back part contacting with the reinforcing strips 12 and the adjacent shoulder forming portions, while the free ends of the closures 57 engage the end walls 13. For this purpose said closures are bent angularly inward, as shown at 64, and then rebent in order to clamp flexible light excluding strips 65 therein, these strips extending inwardly so as to prevent the entrance of light beneath the closures and into the chambers 63. These chambers in practice are designed to receive the film rolls, the film 66 being in the form of a strip wound upon spools 67 and 68 journaled within said chambers 63, and thus the importance of excluding the light therefrom.

The film roll including the sensitized film and the covering strip is normally wound on the spool 67 and passes in back of the guide roller 69 journaled in the opposed enlargements and then passes in back of the guide roller 70 in the other chamber, the portion of the film between these rollers being engaged at its longitudinal edges in the guideways or grooves 38 in a manner to hold the film taut and rectilinear at the portion thereof which is exposed at the large end of the light chamber to take a picture. The film is then wound on the spool or roll 68, the back portion 26 having a sight opening therethrough provided with a red or other transparent panel 71 which serves to exclude actinic rays but which permits the numbers of the films to be observed in order that the films may be successively brought to the proper positions for exposure. The object of holding the film taut and rectilinear in the guideways or grooves 38 is that better results are obtained than when the film is curved in either direction, the film being usually permitted to bulge slightly toward the light chamber and lens, although this is not desired or intended.

The guideways 32 are designed to take a curtain 72 forwardly of the film, be the latter constructed of a continuous piece or independent film sections, and for this purpose one end of the curtain, which is preferably of some black material, is secured to a roller or shaft 73 journaled in the opposed enlargements 53 at one end, with one end projecting through one enlargement or side and having a slotted end 74. The longitudinal edges of the curtain engage in the guideways 32 while the free end of the curtain is designed to be moved toward and away from the other enlargements. That is, the roller 73 is journaled in the enlargements at one end of the camera in the chamber at that end beyond the end wall 13 of the frame and the adjacent light excluding strip 65, while the other end of the film is designed to move toward and away from a corresponding point in the other chamber. For this purpose a rebent metal strip or clamp 75 is attached to the free end of the curtain as by depressing or indenting the same, as shown at 76 in Fig. 17 of the drawings, and so that the free edge of the curtain terminates a short distance from the bight portion of the strip to provide a space 77 therewith. A cord or strand 78 is engaged through the space 77 intermediately of its ends and its extremities are wound on spools 79 near the ends of a roller or shaft 80 journaled in the enlargements at the opposite end of the camera and in a similar manner to the roller 73, the roller 80 also having a slotted end 74 which, like the slotted end of the roller 73, terminates flush with the outer face of the adjacent enlargement in such a manner as to expose said slotted end to permit the rollers or shafts to be turned, as by the application of a key 81 shown in Fig. 18 of the drawings.

The curtain 72 is held toward the rear side or wall of the guideway 32 as by means of spring metal clips or plates 82 which are secured to the front sides thereof, the reinforcing end or strip 75 serving to elevate these clips as the curtain is moved to cover the exposed portion of the film, from the position shown in Fig. 1 of the drawings in which the reinforcing end is shown just entering the guideways prior to the curtain being moved to the last named position. When the curtain is in this position the side portions of the strand or cord 78 will be disposed in the guideways 32 and will be held from displacement by said spring metal clips or plates 82, this being especially desirable owing to the possibility of the cord becoming slack and consequently displaced to overlie the exposed portion of the film and thereby produce a mar on the picture, such as would result were said portions of the strand or cord not held from displacement with respect to the guideways.

The light excluding strips 65 are designed to contact with the curtain at the ends of the guideways 32 in order to prevent light entering between the curtain and the free ends of the closures 57 and when the curtain is moved to cover the exposed portion of the film, or that portion which would be exposed upon the taking of the picture, the side portions of the strand 78 are wound on the spools 79 while the reinforcing end 75 of the curtain travels in the guideways 32, it being understood that the curtain may operate from either end of the camera. As before mentioned, the shafts or rollers 73 and 80 project only through one side of the back portion and said back portion is designed to be fitted to the front portion so as to be received within the side walls 11, while the ends of the front and back portions will fit flush together, the usual or any preferred form of fasteners 83 being provided on the back portion to engage the side walls 11 of the front portion to secure said parts together, while said side walls are recessed, as shown at 84, to permit actuation of these fasteners in a manner well known in the art.

The rolls or spools 67 and 68 are supported upon the usual spring actuated pivots 85. These pivots are mounted in recesses in the opposed sides of the back portion of the camera to be hidden from view when the latter is fitted in the front portion as described. However, in order to permit actuation of the film in order to advance successive films for exposing the same, one of said sides or enlargements of the back portion of the camera is provided with a transverse aperture 86, on the inner side of which a plate 87 is mounted, having a key slot or aperture 88 therethrough which includes diametrically oppositely projecting extensions or recesses 89. A plate 90 is embedded in the outer face of the enlargement at the aperture 86, as are the mountings of the pivots 85, and this plate 90 is provided with radial ratchet teeth 91 surrounding the aperture thereof, which are engaged by corresponding ratchet teeth 92 of a slotted operating head 93 which is fitted against the plate 90 and which is provided with a stem 94 formed with a bit 95 projecting in opposite directions to engage one end of the usual film roll or spool on which the film is wound by successively bringing the films to exposed positions in the use of the camera.

The adjacent side portion 11 of the front part of the camera carries a spring actuated key 96, the bit 97 of which is in the form of a blade designed to enter the slot of the head 93 under the action of a spring 98, and as the spring normally holds said parts in engagement the film may be moved in one direction while the front and back portions of the camera are co-engaged, but when these parts are separated the head 93 may be drawn outward to disengage the ratchet teeth and notches and cause the bit 95 to be displaced from the spool or reel onto which the film is wound so as to permit the latter spool to be moved in either direction. By this construction only the operating key 96 will be exposed as distinguished from the exposure of all of the pivots in this type of camera as heretofore constructed. The side wall 11 carrying the key 96 is, however, constructed to permit the application of the key 81 for turning the rollers or shafts 73 and 80, and for this purpose said wall adjacent to the slotted ends of the shaft is provided with an aperture with inner and outer plates 99 secured in rabbeted portions thereof and adapted to retain slotted cylinders or barrels 100 therebetween for free rotation so that the key may be applied to the slots of the cylinders or barrels according to the direction in which the curtain is to be moved, and by turning the key and corresponding cylinder therewith, the key will be caused to enter the slot in the adjacent end of the roller 73 or 80 as the case may be. In practice the roller 73 will be used to move the curtain to a position to uncover the film in rear of the light chamber, while the roller 80 will be used to move the curtain to an opposite position by winding the side portions of the strand or cord 78 thereon, the film being so covered that separation of the front and back portions of the camera in daylight is permitted without injuring the film and in such a manner as to permit focusing by the use of the ground glass panel and hood in the manner heretofore explained.

From the foregoing description it is thought that the construction and operation of the camera is apparent and that further description will be unnecessary.

Having thus described my invention, what I claim as new and desire to secure by Letters Patent is:—

1. A focusing roll film camera, comprising a front portion having a light chamber, lens, shutter and parts coöperative therewith, a back portion adapted for removable connection with the front portion and having film carrying means, said back portion having film chambers at the ends thereof between which the film is designed to be passed for positioning the same in rear of the light chamber for exposure when said front and back portions are connected, means accessibly closing said chambers to permit the application and removal of a film roll, a curtain operating between said last named means for covering and uncovering the film therebetween and at the part adapted to be exposed in rear of the light chamber, whereby when the back portion is removed from the front portion the film will be unaffected or uninjured by light rays from without and means coöperative with the front portion in rear of the light chamber to permit focusing of a picture to be taken upon the application of the back portion and the uncovering of the film behind the light chamber.

2. A focusing roll film camera, comprising a front portion having side walls, a frame between said side walls and spaced from the ends thereof, a light chamber for coöperation with the frame and adapted to be inclosed therein, a lens at the end of the light chamber, a shutter coöperative with the lens and light chamber, a back portion designed to fit said front portion and having an intermediate cutout portion accommodating the film, film supporting rolls at the ends of said back portion, guideways therebetween, guide rollers coöperating with said rolls to direct a film through said guideways for exposure in rear of the light chamber, means for moving the film with respect to said rolls, additional guideways in front of said first mentioned guideways and means movable in the last mentioned guideways to cover and uncover the film at said last mentioned operation.

3. A focusing roll film camera, comprising a front portion having side walls, a frame between said side walls and spaced from the ends thereof, a light chamber for coöperation with the frame and adapted to be inclosed therein, a lens at the end of the light chamber, a shutter coöperative with the lens and light chamber, a back portion designed to fit said front portion and having an intermediate cutout portion accommodating the film, film supporting rolls at the ends of said back portion, guideways therebetween, guide rollers coöperating with said rolls to direct a film through said guideways for exposure in rear of the light chamber, means for moving the film with respect to said rolls, additional guideways in front of said first mentioned guideways, a curtain coöperative with said last mentioned guideways, a roller on which said curtain is adapted to be wound at one end, a roller having connection with the other end of the curtain for unwinding the same with respect to the first mentioned roller whereby the curtain will be moved in the guideways to cover the film at the portion thereof which is adapted to be exposed, guideways carried by the front portion in rear of said frame and adapted to take a ground glass panel or the like to permit focusing when the back portion is displaced with respect to the front portion and light excluding means for said chambers.

4. A focusing roll film camera, comprising a front portion having side walls, a frame between said side walls and spaced from the ends thereof, a light chamber for coöperation with the frame and adapted to be inclosed therein, a lens at the end of the light chamber, a shutter coöperative with the lens and light chamber, a back portion designed to fit said front portion and having an intermediate cutout portion accommodating a film, film supporting rolls at the ends of said back portion, guideways therebetween, guide rollers coöperating with said rolls to direct a film through said guideways for exposure in rear of the light chamber, means for moving the film with respect to said rolls, additional guideways in front of said first mentioned guideways, a curtain coöperative with said last mentioned guideways, a roller on which said curtain is adapted to be wound at one end, a roller having connection with the other end of the curtain for unwinding the same with respect to the first mentioned roller whereby the curtain will be moved in the guideways to cover the film at the portion thereof which is adapted to be exposed, said front and back portions having curved ends disposed in contact when said parts are fitted together, closures for the ends of the back portion to exclude light from the film wound on the rolls, and light excluding strips carried by the free ends of the closures for coöperation with the curtain.

5. A focusing roll film camera, comprising a front portion having side walls, a frame between said side walls and spaced from the ends thereof, a light chamber for coöperation with the frame and adapted to be inclosed therein, a lens at the end of the light chamber, a shutter coöperative with the lens and light chamber, a back portion designed to fit said front portion and having an intermediate cutout portion accommodating a film, film supporting rolls at the ends of said back portion, guideways therebetween, guide rollers coöperating with said rolls to direct a film through said guideways for exposure in rear of the light chamber, means for moving the film with respect to said rolls, additional guideways in front of said first mentioned guideways, a curtain coöperative with said last mentioned guideways, a roller on which said curtain is adapted to be wound at one end, a roller having connection with the other end of the curtain for unwinding the same with respect to the first mentioned roller whereby the curtain will be moved in the guideways to cover the film at the portion thereof which is adapted to be exposed, said front and back portions having curved ends disposed in contact when said parts are fitted together, closures for the ends of the back portion to exclude light from the film wound on the rolls, light excluding strips adjacent to the rear portion of the frame coincident with the ends of the camera to additionally exclude light from the film on the rolls, a closure for the front portion of the camera at the frame thereof, guideways carried by the front portion and accommodated by the back portion when said parts are assembled, a pocket in the back portion and a ground glass panel carried in said pocket and fitted in said last mentioned guideways to permit the use of the front portion for focusing when the back portion is removed therefrom.

6. A focusing roll film camera, comprising a front portion having side walls and curved ends, said front portion having a light chamber and coöperative picture taking accoutrements, a back portion having end enlargements and intermediate rebent portions providing pairs of longitudinal guideways, said back portion having curved ends abutting the curved ends of the front portion when said parts are fitted together, closures coöperative with said enlargements to provide chambers at the ends of the back portion, means to removably support film spools for rotation in said chambers whereby the film carried thereon may be engaged in certain of said guideways and held rectilinear in rear of the light chamber, a light excluding curtain movable in the other guideways, the mountings of said spools and curtain being excluded from view by the side walls of the front portion, means carried by one of said side walls for moving the curtain and additional means carried by said side wall for moving the film.

7. A focusing roll film camera, comprising a front portion having side walls and curved ends, said front portion having a light chamber and coöperative picture taking accoutrements, a back portion having end enlargements and intermediate rebent portions providing pairs of longitudinal guideways, said back portion having curved ends abutting the curved ends of the front portion when said parts are fitted together, closures coöperative with said enlargements to provide chambers at the ends of the back portion, means to removably support film spools for rotation in said chambers whereby the film carried thereon may be engaged in certain of said guideways and held rectilinear in rear of the light chamber, rollers journaled in the opposed enlargements at the chambers, said rollers each having a slotted end exposed through the enlargements at one side of said back portion, a light excluding curtain wound on one roller, flexible connections between the free end of the curtain and the other roller whereby the curtain may be moved to cover or uncover the film between said rollers by the rotation thereof, light excluding strips carried by the free ends of the closures to coöperate with the curtain at the ends of the guideways, slotted members rotatably carried in one side wall of the front portion for the application of a key to the slotted ends of the curtain rollers to permit rotation of the latter for the purpose specified and means carried by said wall for rotating one of the spools for advancing the film, said back portion having a side opening for rendering visible the numbers of the films therethrough.

8. A focusing roll film camera, comprising a front portion having side walls and curved ends, said front portion having a light chamber and coöperative picture taking accoutrements, a back portion having end enlargements and intermediate rebent portions providing pairs of longitudinal guideways, said back portion having curved ends abutting the curved ends of the front portion when said parts are fitted together, closures coöperative with said enlargements to provide chambers at the ends of the back portion, means to removably support film spools for rotation in said chambers whereby the film carried thereon may be engaged in certain of said guideways and held rectilinear in rear of the light chamber, rollers journaled in the opposed enlargements at the chambers, said rollers each having a slotted end exposed through the enlargements at one side of said back portion, a light excluding curtain wound on one roller, flexible connections between the free end of the curtain and the other roller whereby the curtain may be moved to cover or uncover the film between said rollers by the rotation thereof, light excluding strips carried by the free ends of the closures to coöperate with the curtain at the ends of the guideways, slotted members rotatably carried in one side wall of the front portion for the application of a key to the slotted ends of the curtain rollers to permit rotation of the latter, keepers arranged in the guideways of the curtain to engage the latter for excluding light and preventing displacement of the flexible connections operating therein, pivots in the enlargements for supporting the spools and permitting the removal thereof, one of said pivots having a bit end and a slotted head, coöperative ratchet faces at the inner side of said head and the co-acting face of the adjacent enlargement and an operating key carried by the corresponding side wall of the front portion of the camera and having a bit to fit said slotted head for advancing the film by rotation of the adjacent spool.

9. A focusing roll film camera, comprising a front portion having side walls and curved ends, said front portion having a light chamber and coöperative picture taking accoutrements, a back portion having end enlargements and intermediate rebent portions providing pairs of longitudinal guideways, said back portion having curved ends abutting the curved ends of the front portion when said parts are fitted together, closures coöperative with said enlargements to provide chambers at the ends of the back portion, means to removably support film spools for rotation in said chambers whereby the film carried thereon may be engaged in certain of said guideways and held rectilinear in rear of the light chamber, rollers journaled in the opposed enlargements at the chambers, said rollers each having a slotted end exposed through the enlargements at one side of said back portion, a light excluding member carried by the back portion and coöperative with the other guideways to protect the film from chemically active light rays when the back portion is displaced relative to the front portion, said rebent edges of the back portion having depressions, grooved guides pivoted to the front portion and accommodated by said depressions when the front and back portions are connected, said back portion having a depression forming a seat, a closure for said seat and a ground glass panel mounted therein for engagement with the last named guideways when the front and back portions are disconnected and the film is covered, whereby focusing is permitted.

10. A focusing roll film camera, comprising a front portion having side walls and curved ends, said front portion having a light chamber and coöperative picture taking accoutrements, a back portion having end enlargements and intermediate rebent portions providing pairs of longitudinal guideways, said back portion having curved ends abutting the curved ends of the front portion when said parts are fitted together, closures coöperative with said enlargements to provide chambers at the ends of the back portion, means to removably support film spools for rotation in said chambers whereby the film carried thereon may be engaged in certain of said guideways and held rectilinear in rear of the light chamber, rollers journaled in the opposed enlargements at the chambers, said rollers each having a slotted end exposed through the enlargements at one side of said back portion, a light excluding curtain wound on one roller, flexible connections between the free end of the curtain and the other roller whereby the curtain may be moved to cover or uncover the film between said rollers by the rotation thereof, light excluding strips carried by the free ends of the closures to coöperate with the curtain at the ends of the guideways, slotted members rotatably carried in one side wall of the front portion for the application of a key to the slotted ends of the curtain rollers to permit rotation of the latter, keepers arranged in the guideways of the curtain to engage the latter for excluding light and preventing displacement of the flexible connections operating therein, pivots in the enlargements for supporting the spools and permitting the removal thereof, one of said pivots having a bit end and a slotted head, coöperative ratchet faces at the inner side of said head and the coacting face of the adjacent enlargement, an operating key carried by the corresponding side wall of the front portion of the camera and having a bit to fit said slotted head for advancing the film by rotation of the adjacent spool, light excluding means at the connections of the closures forming the end chambers, said back portion having a receptacle, a closure therefor designed to cover a ground glass therein, means carried by the front portion to support said ground glass in rear of the light chamber and a collapsible hood adapted for removable engagement with the front portion over said ground glass for focusing therethrough when said front and back portions are disconnected.

In testimony whereof I have signed my name to this specification in the presence of two subscribing witnesses.

EDGAR U. WRIGHT.

Witnesses:
JOHN E. BURCH,
PHILIP D. ROLLHAUS.